(12) United States Patent
Yasunori et al.

(10) Patent No.: US 11,801,798 B2
(45) Date of Patent: Oct. 31, 2023

(54) JOINT CONNECTOR

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Hiromichi Yasunori, Yokkaichi (JP); Makoto Chujo, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 343 days.

(21) Appl. No.: 17/413,267

(22) PCT Filed: Dec. 11, 2019

(86) PCT No.: PCT/JP2019/048431
§ 371 (c)(1),
(2) Date: Jun. 11, 2021

(87) PCT Pub. No.: WO2020/122106
PCT Pub. Date: Jun. 18, 2020

(65) Prior Publication Data
US 2022/0340093 A1    Oct. 27, 2022

(30) Foreign Application Priority Data

Dec. 11, 2018    (WO) .................. PCT/JP2018/045388

(51) Int. Cl.
*H01R 12/00*    (2006.01)
*B60R 16/023*    (2006.01)
(Continued)

(52) U.S. Cl.
CPC ...... *B60R 16/0238* (2013.01); *B60R 16/0215* (2013.01); *H02G 3/16* (2013.01); *H04L 12/40* (2013.01); *H04L 2012/40215* (2013.01)

(58) Field of Classification Search
CPC . H02G 3/16; H04L 12/40; H04L 2012/40215; B60R 16/0215; B60R 16/0238
USPC ........................................................ 439/76.2
See application file for complete search history.

(56) References Cited

U.S. PATENT DOCUMENTS 8,231,404 B2 *   7/2012   Ikeda ................. B60R 16/0238
                                                       439/540.1
8,823,386 B2 *   9/2014   Funakoshi ............. G01R 31/52
                                                          324/543

(Continued)

FOREIGN PATENT DOCUMENTS

JP        2013-025917 A       2/2013

OTHER PUBLICATIONS

International Search Report, Application No. PCT/JP2019/048431, dated Mar. 3, 2020. ISA/Japan Patent Office.

*Primary Examiner* — Harshad C Patel
*Assistant Examiner* — Vladimir Imas
(74) *Attorney, Agent, or Firm* — Honigman LLP

(57) ABSTRACT

A joint connector configured to have a plurality of wire harnesses connected thereto and join the plurality of wire harnesses, the joint connector including a sub-connector configured to have connectors of the plurality of wire harnesses inserted therein, a housing inside which the sub-connector is provided, a plurality of joint terminals arranged in parallel with each other in a protruding state within the housing and respectively connected to the connectors of the plurality of wire harnesses, and a relay unit provided in the housing and connected to the plurality of joint terminals, the relay unit being configured to, based on information
(Continued)

included in data transmitted from an in-vehicle ECU or in-vehicle sensor connected to the plurality of wire harnesses, perform relay control of the data between the plurality of joint terminals.

11 Claims, 7 Drawing Sheets

(51) Int. Cl.
  *B60R 16/02* (2006.01)
  *H02G 3/16* (2006.01)
  *H04L 12/40* (2006.01)

(56) References Cited

U.S. PATENT DOCUMENTS

| | | | | |
|---|---|---|---|---|
| 8,998,644 | B2* | 4/2015 | Fukaya | H01R 13/73 439/623 |
| 9,118,503 | B2* | 8/2015 | Okada | H04L 12/4625 |
| 9,272,674 | B2* | 3/2016 | Sasaki | B60R 16/0207 |
| 9,794,286 | B2* | 10/2017 | Otsuka | H04L 12/4625 |
| 10,454,692 | B2* | 10/2019 | Yun | H04L 43/0811 |
| 10,780,847 | B2* | 9/2020 | Takamatsu | B60R 16/0215 |
| 10,931,634 | B2* | 2/2021 | Maeda | G06F 21/85 |
| 11,260,808 | B2* | 3/2022 | Kawauchi | B60R 16/0232 |
| 11,575,699 | B2* | 2/2023 | Haga | H04L 67/12 |
| 11,621,967 | B2* | 4/2023 | Tsurumi | H04L 63/1466 726/22 |
| 11,626,216 | B2* | 4/2023 | Nakamura | H01B 13/01209 174/72 A |
| 2012/0236525 | A1 | 9/2012 | Okada | |
| 2015/0358351 | A1 | 12/2015 | Otsuka et al. | |
| 2017/0302462 | A1 | 10/2017 | Yun et al. | |
| 2018/0167360 | A1 | 6/2018 | Maeda et al. | |
| 2018/0334117 | A1* | 11/2018 | Matsunaga | H01B 7/00 |
| 2019/0118744 | A1 | 4/2019 | Takamatsu et al. | |
| 2020/0172028 | A1 | 6/2020 | Kawauchi et al. | |

\* cited by examiner

JOINT CONNECTOR

CROSS-REFERENCE TO RELATED APPLICATIONS

This application is the U.S. national stage of PCT/JP2019/048431 filed on Dec. 11, 2019, which claims priority of PCT/JP2018/045388 on Dec. 11, 2018, the contents of which are incorporated herein.

TECHNICAL FIELD

The present disclosure relates to a joint connector.

BACKGROUND

A connector format called a joint connector is known as a connector for collectively connecting a plurality of wires routed from a plurality of electronic devices installed in an automobile or the like (e.g., see JP 2013-25917A).

The joint connector of JP 2013-25917A is provided with a terminal fitting that is electrically connected to a terminal of a narrow pitch connector serving as a mating connector constituting a sub-harness and a connector housing that houses the terminal fitting and mates with the narrow pitch connector, and is connected to a plurality of wire harnesses for performing communication using CAN (Control Area Network) and joins the plurality of wire harnesses. An in-vehicle ECU (Electronic Control Unit) for controlling an in-vehicle device is connected to each of these plurality of wire harnesses.

While the number of in-vehicle ECUs that are installed and the amount of data that is transmitted and received between these in-vehicle ECUs are on an increasing trend with the increasing functionality of vehicles in recent years, the joint connector of JP 2013-25917A does not take into consideration relay control of data that is transmitted and received between these in-vehicle ECUs.

An object of the present disclosure is to provide a joint connector that is able to perform relay control of data flowing through wire harnesses connected thereto.

SUMMARY

A joint connector according to one mode of the present disclosure is a joint connector configured to have a plurality of wire harnesses connected thereto and join the plurality of wire harnesses, the joint connector including a sub-connector configured to have connectors of the plurality of wire harnesses inserted therein, a housing inside which the sub-connector is provided, a plurality of joint terminals arranged in parallel with each other in a protruding state within the housing, provided on one surface of the joint connector, and respectively connected, on the one surface, to the connectors of the plurality of wire harnesses, and a relay unit provided in the housing and connected to the plurality of joint terminals, the relay unit being configured to, based on information included in data transmitted from an in-vehicle ECU or in-vehicle sensor connected to the plurality of wire harnesses, perform relay control of the data between the plurality of joint terminals.

Advantageous Effects of Disclosure

According to one mode of the present disclosure, a joint connector that is able to perform relay control of data flowing through wire harnesses connected thereto can be provided.

DETAILED DESCRIPTION OF EMBODIMENTS OF DISCLOSURE

Figure 1:
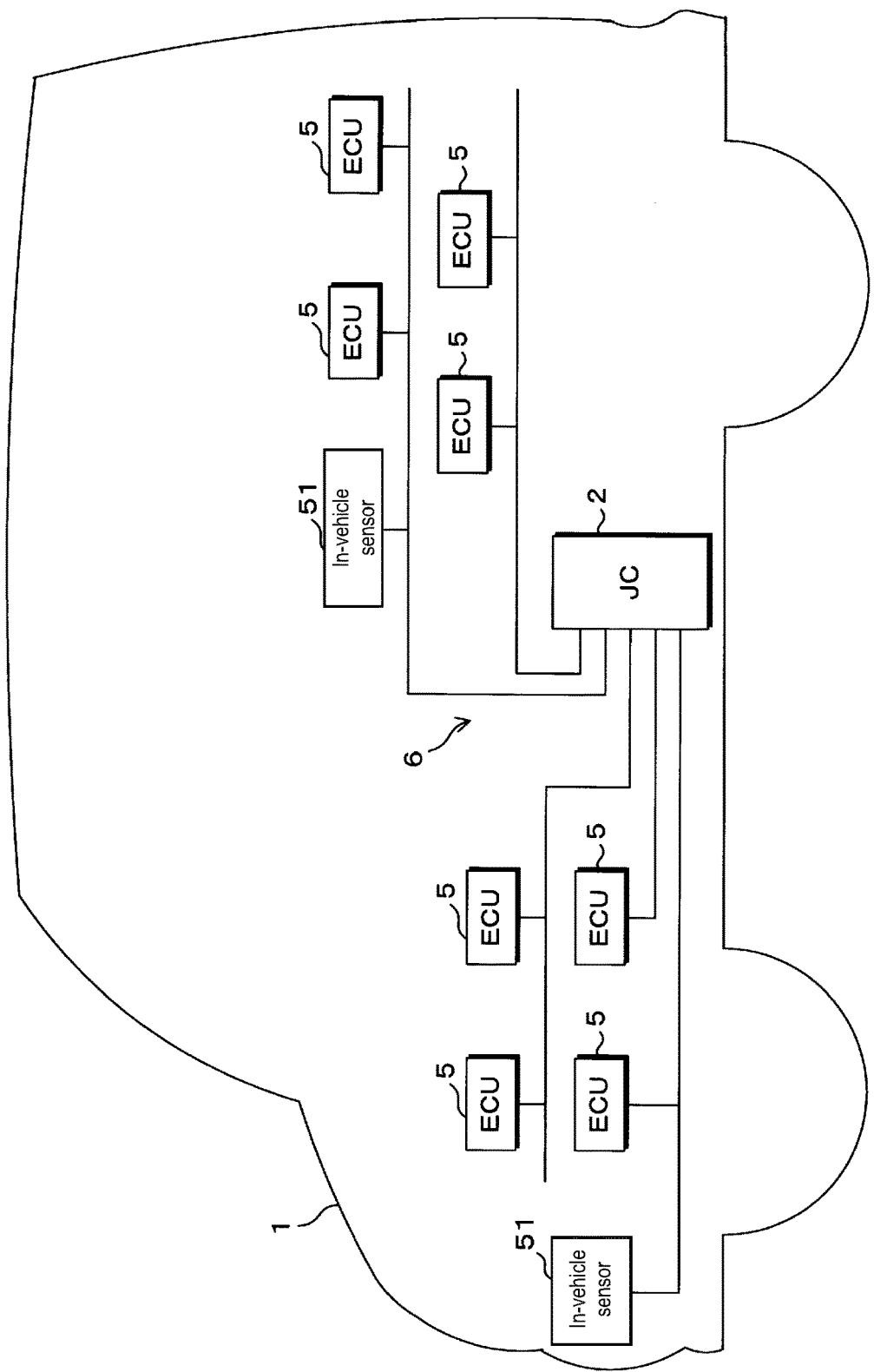
FIG. 1 is a schematic view of a vehicle in which a joint connector of Embodiment 1 of installed.

Embodiments of the present disclosure will initially be enumerated and described. Also, at least some of the embodiments described below may be suitably combined.

A joint connector according to one mode of the present disclosure is a joint connector configured to have a plurality of wire harnesses connected thereto and join the plurality of wire harnesses, the joint connector including a sub-connector configured to have connectors of the plurality of wire harnesses inserted therein, a housing inside which the sub-connector is provided, a plurality of joint terminals arranged in parallel with each other in a protruding state within the housing, provided on one surface of the joint connector, and respectively connected, on the one surface, to the connectors of the plurality of wire harnesses, and a relay unit provided in the housing and connected to the plurality of joint terminals, the relay unit being configured to, based on information included in data transmitted from an in-vehicle ECU or in-vehicle sensor connected to the plurality of wire harnesses, perform relay control of the data between the plurality of joint terminals.

In this mode, a relay unit is provided inside a housing of a joint connector, and, based on information included in data transmitted from an in-vehicle ECU that is connected to a wire harness, the relay unit performs relay control of the data between a plurality of joint terminals. Accordingly, data that is transmitted through a plurality of wire harnesses that are connected to the joint connector can be appropriately relayed to the required in-vehicle ECU or in-vehicle sensor. By using a joint connector provided with a relay unit that performs the relay control, the degree of freedom for routing the wire harnesses in a vehicle can be improved. Furthermore, the plurality of joint terminals are provided on one surface of the joint connector which has rectangular shape, and connectors of the plurality of wire harnesses are respectively connected, on the one surface, to the plurality of joint terminals. Accordingly, the joint connector and the plurality of wire harnesses are connected on one surface of the joint connector, and the connection point between the joint connector and the plurality of wire harnesses can be consolidated on a single surface (one surface), enabling assembly of the joint connector at the vehicle manufacturing stage to be facilitated and manufacturing efficiency to be improved.

In the joint connector according to one mode of the present disclosure, the in-vehicle ECU or in-vehicle sensor communicates by at least one communication protocol out of CAN and Ethernet (registered trademark), and the relay unit includes at least one of a CAN gateway and a layer 2 Ethernet switch.

In this mode, the relay unit includes at least one of a CAN gateway and a layer 2 Ethernet switch and exhibits the functions of one thereof, thus enabling relay control to be efficiently performed, in the case where the communication protocol of an in-vehicle LAN that is constituted by wire harnesses to which in-vehicle ECUs or in-vehicle sensors are connected is CAN or Ethernet.

In the joint connector according to one mode of the present disclosure, the connectors of the plurality of wire harnesses are each provided with a CAN transceiver or an Ethernet PHY, and the relay unit is connected to the CAN transceiver or the Ethernet PHY via the joint terminal.

In this mode, the connectors of the plurality of wire harnesses are provided with a CAN transceiver or an Ethernet PHY. Accordingly, in exhibiting the functions of at least one of the CAN gateway and the layer 2 Ethernet switch, the relay unit does not need to function as a physical interface with the wire harnesses, enabling the processing load of the relay unit to be reduced and the size of the joint connector to be reduced.

In the joint connector according to one mode of the present disclosure, the in-vehicle ECU or in-vehicle sensor communicates by at least one communication protocol out of CAN and Ethernet, and the relay unit includes a CAN gateway and a layer 2 Ethernet switch, and performs protocol conversion between the CAN and Ethernet communication protocols.

In this mode, by using a joint connector provided with a relay unit that includes a CAN gateway and a layer 2 Ethernet switch, exhibits the functions thereof, and performs protocol conversion between the CAN and Ethernet communication protocols, the degree of freedom for routing of wire harnesses that use a mix of the CAN and Ethernet communication protocols in a vehicle can be improved.

In the joint connector according to one mode of the present disclosure, the relay unit has connected thereto a power terminal that receives input of power output from one in-vehicle ECU or in-vehicle sensor among the in-vehicle ECUs or in-vehicle sensors connected to the plurality of wire harnesses, or the joint terminal is a power-communication shared terminal through which the data relay controlled by the relay unit flows, and that receives input of power output from one in-vehicle ECU or in-vehicle sensor among the in-vehicle ECUs or in-vehicle sensors connected to the plurality of wire harnesses.

In this mode, the relay unit is provided with a power terminal for receiving input of power that is output from one in-vehicle ECU or in-vehicle sensor among the in-vehicle ECUs or in-vehicle sensors connected to the plurality of wire harnesses, thus enabling routing of a power line to the joint connector to be simplified. Alternatively, the joint terminal is a power-communication shared terminal through which the data that is relay controlled by the relay unit flows and for receiving input of power that is output from one in-vehicle ECU or in-vehicle sensor of the in-vehicle ECUs or in-vehicle sensors connected to the plurality of wire harnesses, thus enabling the cable for communication and power supply to be shared and the routing of cables in a vehicle to be simplified. The power-communication shared terminal is a terminal that supports PoE (Power over Ethernet), for example.

The joint connector according to one mode of the present disclosure includes an anomaly detection unit provided in the housing and configured to perform anomaly detection of each of the plurality of wire harnesses respectively connected to the plurality of joint terminals.

In this mode, the joint connector is provided with an anomaly detection unit that performs anomaly detection of each of the plurality of wire harnesses respectively connected to the plurality of joint terminals, thus enabling the accuracy of anomaly detection on the wire harnesses to be improved.

The joint connector according to one mode of the present disclosure includes a security determination unit provided in the housing and configured to perform security determination on data transmitted from the in-vehicle ECUs or in-vehicle sensors connected to the plurality of wire harnesses.

In this mode, the joint connector is provided with a security determination unit that performs security determination on data that is transmitted from the in-vehicle ECUs or in-vehicle sensors connected to the plurality of wire harnesses, thus enabling the accuracy of security determination on data flowing through the wire harnesses to be improved.

In the joint connector according to one mode of the present disclosure, the relay unit has connected thereto a power terminal that receives input of power output from one in-vehicle ECU or in-vehicle sensor among the in-vehicle ECUs or in-vehicle sensors connected to the plurality of wire harnesses, and at least one joint terminal among the plurality of joint terminals is provided in a pair with the power terminal.

In this mode, in the relay unit, a power terminal for receiving input of power that is output from an in-vehicle ECU connected to the plurality of wire harnesses is provided in a pair with at least one joint terminal, thus enabling routing of a power line to the joint connector to be simplified. By providing the power terminal in a pair with a joint terminal, a plurality of joint terminals and the power terminal can be provided in a consolidated manner on one surface of the joint connector having a rectangular shape. Accordingly, connection can be facilitated, in connecting a plurality of wire harnesses that include a power line to the joint connector, and assembly of the joint connector can be efficiently performed.

Specific examples of a joint connector 2 according to embodiments of the present disclosure will be described below with reference to the drawings. Note that the present disclosure is not limited to these illustrative examples and is defined by the claims, and all changes that come within the meaning and range of equivalency of the claims are intended to be embraced therein.

Embodiment 1

FIG. 1 is a schematic view of a vehicle 1 in which the joint connector 2 of Embodiment 1 is installed. In the vehicle 1, a plurality of in-vehicle ECUs 5 for controlling various in-vehicle devices such as actuators (not shown) or in-vehicle sensors 51 including various sensors such as cameras and Lidar (Light Detection and Ranging; Laser Imaging, Detection and Ranging) sensors are installed, and these plurality of in-vehicle ECUs 5 or in-vehicle sensors 51 are communicably connected to each other by the joint connector 2. As shown in FIG. 1, the joint connector 2 divides an in-vehicle LAN 6 into a plurality of segments (five segments in FIG. 1), and, between the segments, performs control of relay (relay control) of communication between the in-vehicles ECU 5 or in-vehicle sensors 51 connected in each segment.

The communication protocol that is used by the in-vehicle ECUs in the in-vehicle LAN 6 is CAN (Control Area Network; registered trademark) or TCP/IP over Ethernet (registered trademark), for example, and the joint connector 2 determines the relay path and performs relay between the segments, in accordance with these communication protocols. The joint connector 2 may also function as a gateway for performing relay control between different communication protocols, such as between CAN and TCP/IP (Ethernet), for example.

Figure 2:
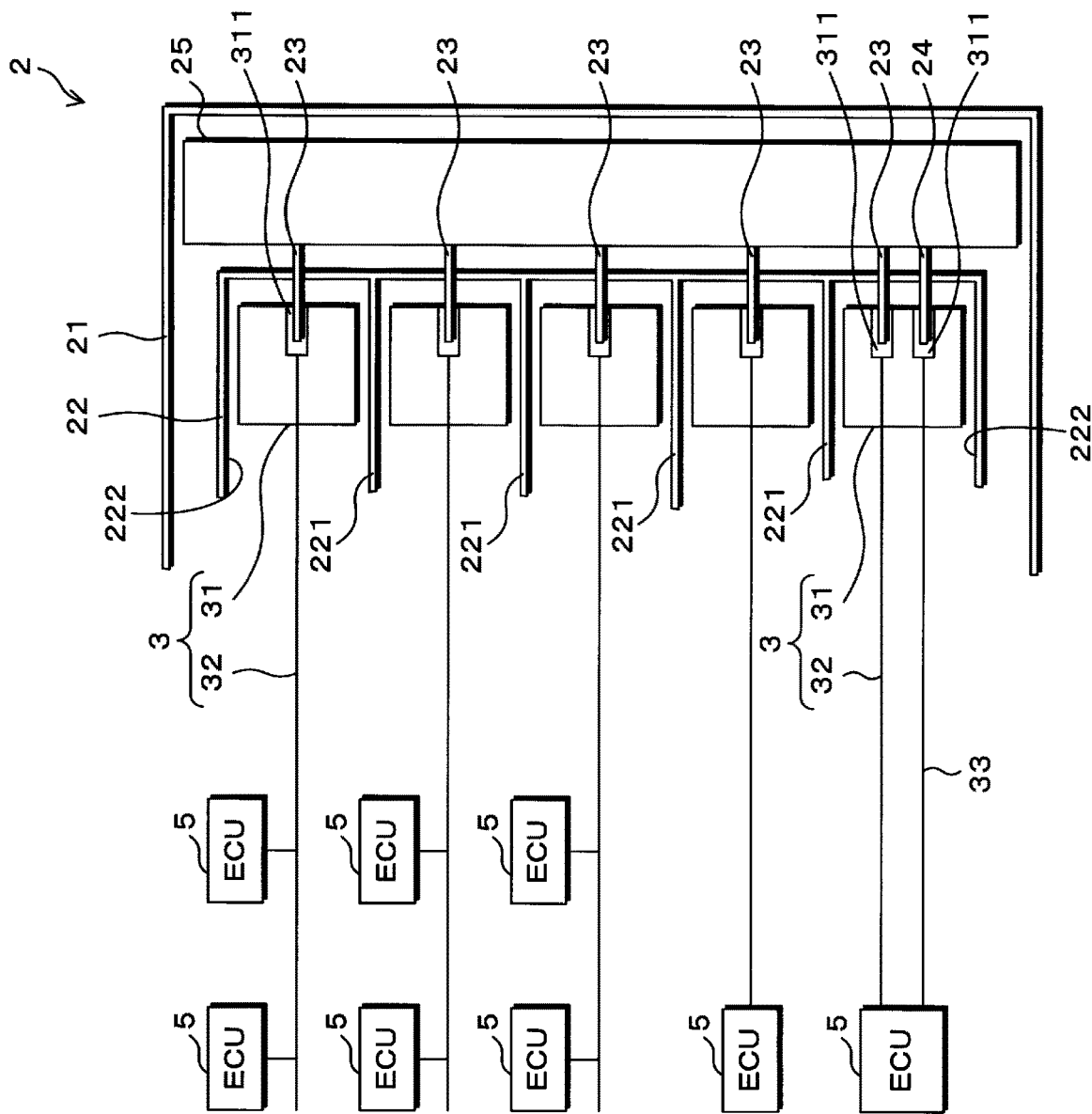
FIG. 2 is a side cross-sectional view schematically illustrating the joint connector.

FIG. 2 is a side cross-sectional view schematically illustrating the joint connector 2. The joint connector 2 is provided with a housing 21, a sub-connector 22 and a relay unit 25, and joint terminals 23 and a power terminal 24 are provided on the relay unit 25. As illustrated, the joint connector 2 has a rectangular shape, and the joint terminals 23 are provided on one surface of the joint connector 2. That is, the joint terminals 23 are provided in a consolidated manner on the same surface (one surface) of the joint connector 2.

The housing 21 has a box shape (bottomed rectangular tube) having an opening on one side, and is made of resin, for example. The relay unit 25 is provided inside the housing 21.

The relay unit 25 is an electronic component that has a rectangular parallelepiped shape and has been waterproofed by resin molding or the like, for example. The relay unit 25 is provided with one surface of the relay unit 25 facing an inner surface of a bottom plate part that is located on the other side of the housing 21. The one surface of the relay unit 25 and the inner surface of the bottom plate part of the housing 21 are bonded, fastened or the like together, and the relay unit 25 is fixed inside the housing 21. The plurality of joint terminals 23 are provided in parallel with each other on the other surface of the relay unit 25. The one surface of the relay unit 25 is located on the bottom plate part side of the housing 21. The other surface of the relay unit 25 is located on the opening side of the housing 21.

The joint terminals 23 are conductive members that are electrically connected to a relay control unit 251 included in the relay unit 25 which will be described later. The joint terminals 23 each protrude from the other surface of the relay unit 25 toward the opening of the housing 21, and mate with a female connector 31 of a wire harness 3 which will be described later, and function as a male terminal that electrically contacts a female terminal 311 in the female connector 31.

The sub-connector 22 has a tubular shape provided with a plurality of socket parts 222 partitioned by a plurality of partition plates 221. The socket parts 222 are provided with a female connector opening into which the female connectors 31 of the wire harnesses 3 are inserted and a joint terminal hole into which the joint terminals 23 are inserted, and the female connector opening and the joint terminal hole communicate via the internal space (cavity) of the socket parts 222.

The sub-connector 22 is provided inside the housing 21 with the end side in which the joint terminal holes are provided facing toward the relay unit 25. That is, due to the end of the sub-connector 22 in which the joint terminal holes are provided being inserted through the opening of the housing 21 toward the relay unit 25, the sub-connector 22 mates with the housing 21, and is detachably provided in the housing 21.

By mating the sub-connector 22 and the housing 21, the joint terminals 23 provided on the relay unit 25 are respectively inserted into the joint terminal holes that correspond dispositionally. Due to the joint terminals 23 being inserted into the joint terminal holes, the portion from the leading end to the vicinity of the base end of the joint terminals 23 is located in the internal space (cavity) of the socket parts 222.

At least one joint terminal 23 among the joint terminals 23 provided on the relay unit 25 is provided in a pair with the power terminal 24. The power terminal 24 is a conductive member that is electrically connected to the relay control unit 251 included in the relay unit 25 which will be described later, and is a terminal for supplying power for driving the relay control unit 251. Note that the terminal for supplying power for driving the relay control unit 251 is not limited to the power terminal 24, and a terminal that supports PoE (Power over Ethernet), for example, may be used.

When the sub-connector 22 and the housing 21 are mated, the power terminal 24 is inserted into the joint terminal hole into which the joint terminal 23 paired therewith is inserted. Alternatively, the socket part 222 corresponding to the power terminal 24 may, dispositionally, be provided with a hole for the power terminal 24 into which the power terminal 24 is inserted, separately from the joint terminal hole. The female connector 31 in which the female terminal 311 that contacts the joint terminal 23 and the female terminal 311 that contacts the power terminal 24 are provided is connected to the socket part 222 corresponding to the joint terminal 23 and power terminal 24 provided as a pair in this way.

A plurality of wire harnesses 3 are connected to the joint connector 2 constituted in this way. The wire harnesses 3 include a cable 32 to which one or a plurality of in-vehicle ECUs 5 or in-vehicle sensors 51 are connected and a female connector 31 provided at the leading end of the cable 32. The leading end of the cable 32 is inserted inside the female connector 31 and held by a retainer (not shown) or the like, and is electrically connected to the female terminal 311 that is provided inside the female connector 31.

The number of joint terminals 23 corresponding to each female connector 31 is shown as one in the drawings, but is not limited thereto. The number of joint terminals 23 corresponding to each female connector 31 may be two or more, and is determined based on the communication protocol that is used in communication with the in-vehicle ECUs 5 or the like, with the number of joint terminals 23 corresponding to each female connector 31 being two, in the case where the communication protocol is CAN, for example.

In the present embodiment, the sub-connector 22 is separate from the housing 21 and is detachably provided in the housing 21, but is not limited thereto. The sub-connector 22 may be integrally formed with the housing 21, by resin molding or the like, for example.

Figure 3:
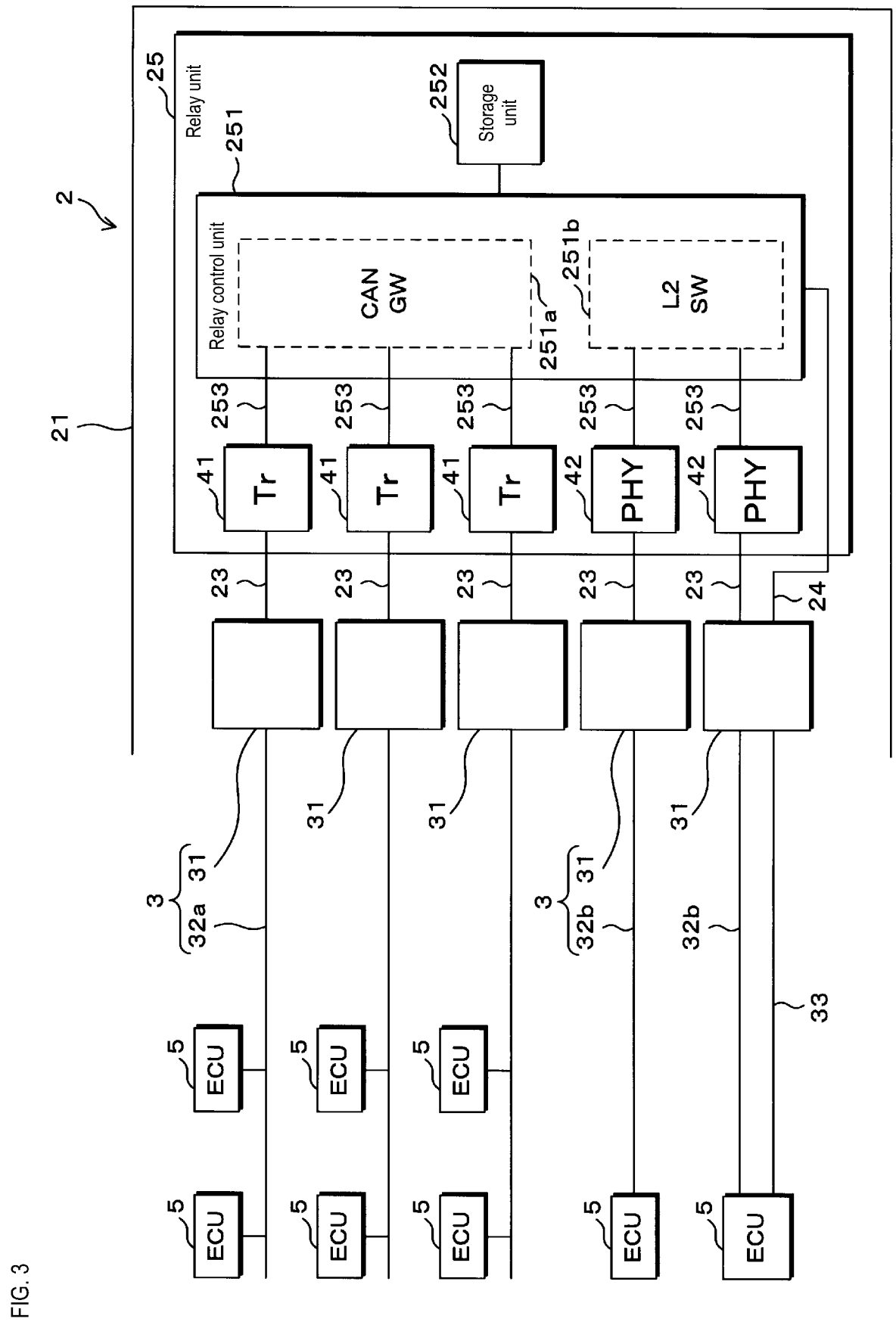
FIG. 3 is a block diagram illustrating an internal configuration of a relay unit of the joint connector.

FIG. 3 is a block diagram illustrating the internal configuration of the relay unit 25 of the joint connector 2. The relay unit 25 provided in the housing 21 of the joint connector 2 includes the relay control unit 251, a storage unit 252, and CAN transceivers 41 (Tr) and Ethernet PHYs 42 (PHY) that are physical layer I/Fs (interfaces) determined based on the communication protocol. Note that, for convenience of description of the various portions, the sub-connector 22 is omitted in FIG. 3.

The storage unit 252 and the physical layer I/Fs (CAN transceivers 41 and Ethernet PHYs 42) are communicably connected to each other by the relay control unit 251 and an internal bus 253. Also, the relay control unit 251 and the power terminal 24 are electrically connected via the internal bus 253, and power supplied from the power terminal 24 is supplied to the relay control unit 251 via the internal bus 253.

The storage unit 252 is constituted by a volatile memory device such as a RAM (Random Access Memory) or a nonvolatile memory device such as a ROM (Read Only Memory), an EEPROM (Electrically Erasable Programmable ROM) or a flash memory, and control programs and data that is referenced during processing are stored in advance. The control programs stored in the storage unit 252 may be obtained by storing control programs read out from a recording medium (not shown) readable by the relay unit 25. Also, the stored control programs may be obtained by downloading control programs from an external computer, not shown, that is connected to a communication network, not shown, and storing the downloaded control programs in the storage unit 252. Furthermore, information relating to route information (routing table) that is prescribed based on the communication protocol, in performing relay control, is stored the storage unit 252.

The relay control unit 251 is constituted by a CPU (Central Processing Unit), an MPU (Micro Processing Unit) or the like, and is configured to perform various control processing and computational processing, by reading out and executing control programs and data stored in advance in the storage unit 252. Also, the relay control unit 251 may be constituted by an IC chip realized by an FPGA (Field Programmable Gate Array), an ASIC (Application Specific Integrated Circuit) or the like, and may perform relay control based on a circuit configuration (relay circuit) such as an FPGA. Alternatively, the relay control unit 251 and the storage unit 252 may be constituted by a microcomputer in which these units are integrally packaged.

The CAN transceivers 41 and Ethernet PHYs 42 are physical layer I/Fs that are determined based on the communication protocol, and interface between the cables 32 of the wire harnesses 3 and the relay control unit 251. The physical layer I/Fs (CAN transceivers 41 and Ethernet PHYs 42) receive a waveform that is transmitted through the cable 32, via the joint terminal 23, decodes the received waveform into a signal represented by a bit string of 1's and 0's, and outputs the resultant signal to the relay control unit 251 via the internal bus 253.

The CAN transceivers 41 support CAN messages that are transmitted on a CAN bus 32a, and function to receive a waveform of the potential difference of a differential voltage on the CAN bus 32a, which is constituted by two sets of wiring, namely, high side wiring and low side wiring, decodes the received waveform into a signal represented by a bit string of 1's and 0's, and outputs the resultant signal to the relay control unit 251 via the internal bus 253.

The Ethernet PHYs 42 support TCP/IP packets that are transmitted through an Ethernet cable 32b such as a 100BASE-T1 or 1000BASE-T1 cable, and function to decode a Manchester waveform into a signal represented by a bit string of 1's and 0's, and output the bit string to the relay control unit 251 via the internal bus 253. The CAN transceivers 41 and Ethernet PHYs 42 are constituted by an IC chip or a circuit board.

The relay control unit 251 functions as a CAN gateway 251a and a layer 2 Ethernet switch 251b, by executing a control program. As shown in FIG. 3, a plurality of CAN buses 32a and Ethernet cables 32b are connected to the relay control unit 251 of the joint connector 2. The CAN gateway 251a includes the functions of a CAN controller. The relay control unit 251 may function as a layer 3 Ethernet switch, in addition to the layer 2 Ethernet switch 251b.

A plurality of in-vehicle ECUs 5 or in-vehicle sensors 51 are connected to each CAN bus 32a, and these in-vehicle ECUs 5 or the like communicate using CAN as the communication protocol. CAN data (CAN message) that is transmitted from each of the in-vehicle ECUs 5 connected to the CAN buses 32a includes a CAN-ID. The CAN-ID is represented by an 11-bit length and stored in a CAN-ID field of the CAN message (data frame). The relay control device 251 extracts the CAN-IDs from CAN messages received via the joint terminals 23 and the CAN transceivers 41, and relays the CAN-IDs with reference to route information for CAN (CAN route information) stored in the storage unit 252. The CAN route information includes the correspondence relationship between the CAN-ID and the CAN transceiver 41 serving as the relay destination, and is stored in the storage unit 252 in the form of a correspondence table (table) of CAN-IDs and CAN transceivers 41 serving as relay destinations of CAN messages that include the CAN-IDs, for example. For example, a physical port number is set for each of the CAN transceivers 41, and the CAN bus 32a (segment) connected to any of the CAN transceivers 41 can be specified by this physical port number.

Based on the CAN-ID extracted from the CAN message, the relay control unit 251 specifies the physical port number of the one or more CAN transceivers 41 corresponding to the extracted CAN-ID, that is, the CAN transceivers 41 serving as the relay destination. The relay control device 251 functions as the CAN gateway 251a, by transmitting the received CAN message from the specified CAN transceivers 41 and performing relay processing (relay control) of the CAN message.

In-vehicle ECUs 5 or in-vehicle sensors 51 are connected to each of the Ethernet cables 32b, and these in-vehicle ECUs 5 or the like communicate using TCP/IP as the middle layer communication protocol. Note that the lower layer communication protocol is Ethernet. The header of the TCP/IP packet that is transmitted from each of the in-vehicle ECUs 5 connected to the Ethernet cables 32b includes an IP address and a MAC (Media Access Control) address indicating the in-vehicle ECU 5 (node) serving as the transmission destination. The MAC address is an address corresponding to the data link layer (layer 2) in the OSI (Open System Interconnect) seven-layer model, and is an address constituted by a vendor code and consecutive numbers that are determined by the manufacturer of the in-vehicle ECU 5 or the like. The IP address is an address corresponding to the network layer (layer 3) in the OSI seven-layer model, and is constituted by a network address and a host address.

The relay control unit 251 extracts the MAC addresses from TCP/IP packets received via the joint terminals 23 and the Ethernet PHYs 42, and relays the extracted MAC addresses with reference to route information for Ethernet (Ethernet route information) stored in the storage unit 252. If the TCP/IP packet does not include a MAC address, the relay control function 251 may extract the IP address from the TCP/IP packet and derive the MAC address from the extracted IP address by using ARP (Address Resolution Protocol). The Ethernet route information is also called a MAC address table, and includes the correspondence relationship between Ethernet PHYs 42 and the MAC addresses of in-vehicle ECUs 5 that are connected to the Ethernet PHYs 42, for example. The MAC address table is stored in the storage unit 252 in the form of a correspondence table (table) of MAC addresses and Ethernet PHYs 42 to which in-vehicle ECUs 5 of the MAC addresses are connected, that is, Ethernet PHYs 42 serving as relay destinations. For example, a physical port number is set for each of the Ethernet PHYs 42, and the Ethernet cable 32b (segment) connected to any of the Ethernet PHYs 42 can be specified by this physical port number.

Based on the MAC address extracted from the TCP/IP packet, the relay control unit 251 specifies the physical port number of the Ethernet PHY 42 corresponding to the extracted MAC address, that is, the Ethernet PHY 42 serving as the relay destination. The relay control unit 251 functions as the layer 2 Ethernet switch 251b, by transmitting the received TCP/IP packet from the specified Ethernet PHY 42 and performing relay processing of the packet.

The relay control unit 251 may function as an interprotocol gateway that performs protocol conversion between CAN and TCP/IP (Ethernet) and performs relay control between CAN and TCP/IP (Ethernet), by executing a control program.

The storage unit 252 stores information relating to conversion between CAN-IDs and MAC addresses or the like in table format (protocol conversion table), for example. The relay control unit 251 performs conversion to a MAC address serving as the transmission destination, based on the CAN-ID extracted from the CAN message, with reference to the protocol conversion table. The relay control unit 251 generates a TCP/IP packet using, as the destination address, the obtained MAC address and an IP address looked up in reverse with reference to an ARP table indicating the correspondence between MAC addresses and IP addresses that is stored in the storage unit 252. The relay control unit 251 stores content data stored in the data field of the CAN message in the data field of the generated TCP/IP packet, and performs relay control by transmitting the generated packet from the Ethernet PHY 42 specified with reference to the Ethernet route information.

Similarly, the relay control device 251 extracts the multicast address of a received TCP/IP packet that has been multicast, and specifies the CAN-ID corresponding to the extracted multicast address, with reference to information relating to conversion between multicast addresses and CAN-IDs that is stored in the storage unit 252. The relay control device 251 generates a CAN message that includes the specified CAN-ID, stores the content data stored in the data field of the received TCP/IP packet in the data field of the generated CAN message, and performs relay control by transmitting the generated CAN message from the CAN transceiver 41 specified with reference to the CAN route information.

Based on information included in data transmitted from the in-vehicle ECUs 5 that are connected to the plurality of wire harnesses 3 connected to the joint connector 2, relay control of the data between a plurality of joint terminals 23 is performed by the relay unit 25 included in the joint connector 2, enabling an increase in traffic on the wire harnesses 3 to be suppressed. By using the joint connector 2 provided with the relay unit 25 that performs the relay control, the degree of freedom for routing the wire harnesses 3 in the vehicle 1 can be improved.

Since the relay control device 251 exhibits functions for serving as the CAN gateway 251a or the layer 2 Ethernet switch 251b or as the CAN gateway 251a and the layer 2 Ethernet switch 251b, relay control can be efficiently performed in the case where the communication protocol of the in-vehicle LAN 6 is CAN or Ethernet. Also, since the relay control unit 251 performs relay control through protocol conversion between the CAN and Ethernet communication protocols, the degree of freedom for routing wire harnesses 3 in the in-vehicle LAN 6 in which a mix of the CAN and Ethernet communication protocols are used can be improved.

The relay unit 25 is provided with the power terminal 24 for receiving input of power that is output from one in-vehicle ECU 5 among the in-vehicle ECUs 5 connected to the plurality of wire harnesses 3, thus enabling routing of a power line 33 to the joint connector 2 to be simplified.

The joint terminals 23 are provided in a consolidated manner on one surface of the joint connector 2 that has a rectangular shape, that is, on the same surface. That is, the joint terminals 23 are provided in a consolidated manner on the same surface (one surface) of the joint connector 2. Accordingly, when assembling a plurality of wire harnesses to the joint connector 2, these plurality of wire harnesses can be easily assembled to only one surface of the joint connector 2 in which the joint terminals 23 are provided. That is, the connection point between the joint connector and the plurality of wire harnesses can be consolidated on one surface (the same surface), enabling assembly of the joint connector at the vehicle manufacturing stage or the like to be facilitated and manufacturing efficiency to be improved.

In the present embodiment, the relay control unit 251 functions as the CAN gateway 251a and the layer 2 Ethernet switch 251b, but is not limited thereto. The relay control unit 251 may exhibit the functions of only the CAN gateway 251a. Also, the relay control unit 251 may exhibit the functions of only the layer 2 Ethernet switch 251b. That is, the relay control unit 251 may function as the CAN gateway 251a or the layer 2 Ethernet switch 251b or as the CAN gateway 251a and the layer 2 Ethernet switch 251b.

Embodiment 2

Figure 4:
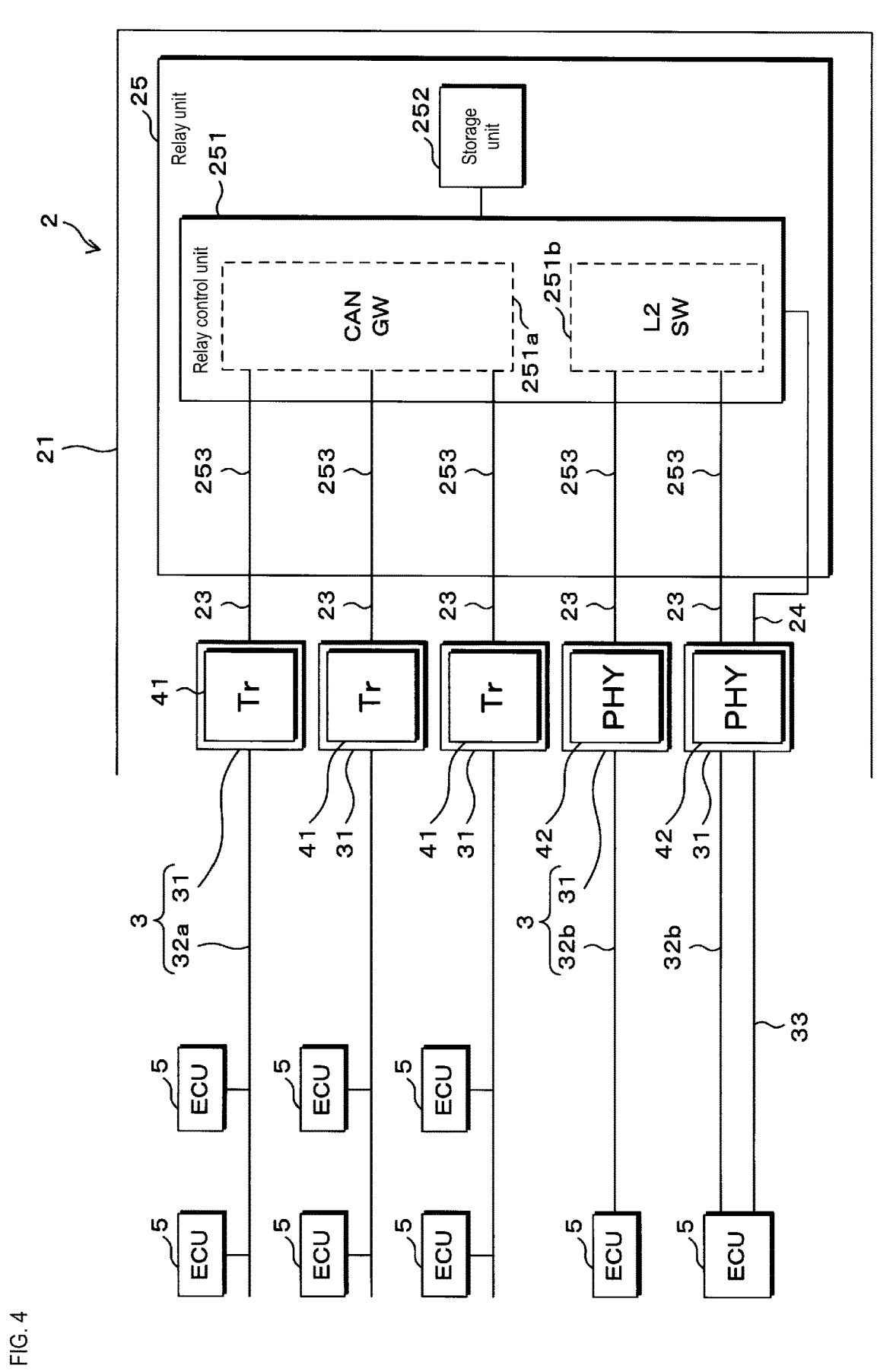
FIG. 4 is a block diagram illustrating the configuration of a relay unit of a joint connector of Embodiment 2.

FIG. 4 is a block diagram illustrating the configuration of a relay unit 25 of a joint connector 2 of Embodiment 2. The joint connector 2 of Embodiment 2 differs from Embodiment 1 in that the relay unit 25 is not provided with physical layer I/Fs (CAN transceivers 41 and Ethernet PHYs 42), and physical layer I/Fs (CAN transceivers 41 and Ethernet PHYs 42) provided inside female connectors 31 of the harnesses 3 are connected to a relay control unit 251 by joint terminals 23.

The joint connector 2 of Embodiment 2 includes a sub-connector 22, a housing 21 and a relay unit 25 provided in the housing 21 similarly to Embodiment 1 (see FIG. 2). The relay unit 25 includes a storage unit 252 and a relay control unit 251. The configurations of the storage unit 252 and the relay control unit 251 are similar to Embodiment 1. On the other surface of the relay unit 25, a plurality of joint terminals 23 are provided in parallel with each other similarly to Embodiment 1.

The joint terminals 23 and the relay control unit 251 are connected via an internal bus 253. That is, the joint terminals 23 and the internal bus 253 are directly connected. Accordingly, the relay unit 25 has a configuration that does not include CAN transceivers 41 or Ethernet PHYs 42.

Female connectors 31 of wire harnesses 3 are connected to the joint connector 2 similarly to Embodiment 1. A CAN transceiver 41 or an Ethernet PHY 42 is provided inside the female connectors 31 of the wire harnesses 3. Female terminals 311 of the female connectors 31 electrically contact the joint terminals 23 of the joint connector 2, due to the female connectors 31 of the wire harnesses 3 being inserted into socket parts 222 of the sub-connector 22 similarly to Embodiment 1. Waveforms that are transmitted through cables 32 (CAN buses 32a or Ethernet cables 32b) of the wire harnesses 3 are decoded by the CAN transceivers 41 or Ethernet PHYs 42 provided in the female connectors 31 into signals represented by bit strings of 1's and 0's. The resultant signals are output from the female terminals 311 of the female connectors 31 and input to the relay control unit 251 via the joint terminals 23 contacting the female terminals 311.

In the route information referenced by the relay control unit 251 in performing relay control, a physical port number for specifying the relay destination is set for each of the joint terminals 23. The relay control unit 251 performs relay control, by specifying the joint terminal 23 serving as the relay destination, based on the extracted CAN-ID or MAC address, and transmitting the CAN message or TCP/IP packet from the specified joint terminal 23.

By providing the physical layer I/Fs (CAN transceivers 41 and Ethernet PHYs 42) inside the female connectors 31 of the wire harnesses 3, physical layer I/Fs (CAN transceivers 41 and Ethernet PHYs 42) do not need to be included in the relay unit 25, enabling the relay unit 25 to be miniaturized. Accordingly, enlargement of the housing 21 that contains the relay unit 25 can be suppressed.

Embodiment 3

Figure 5:
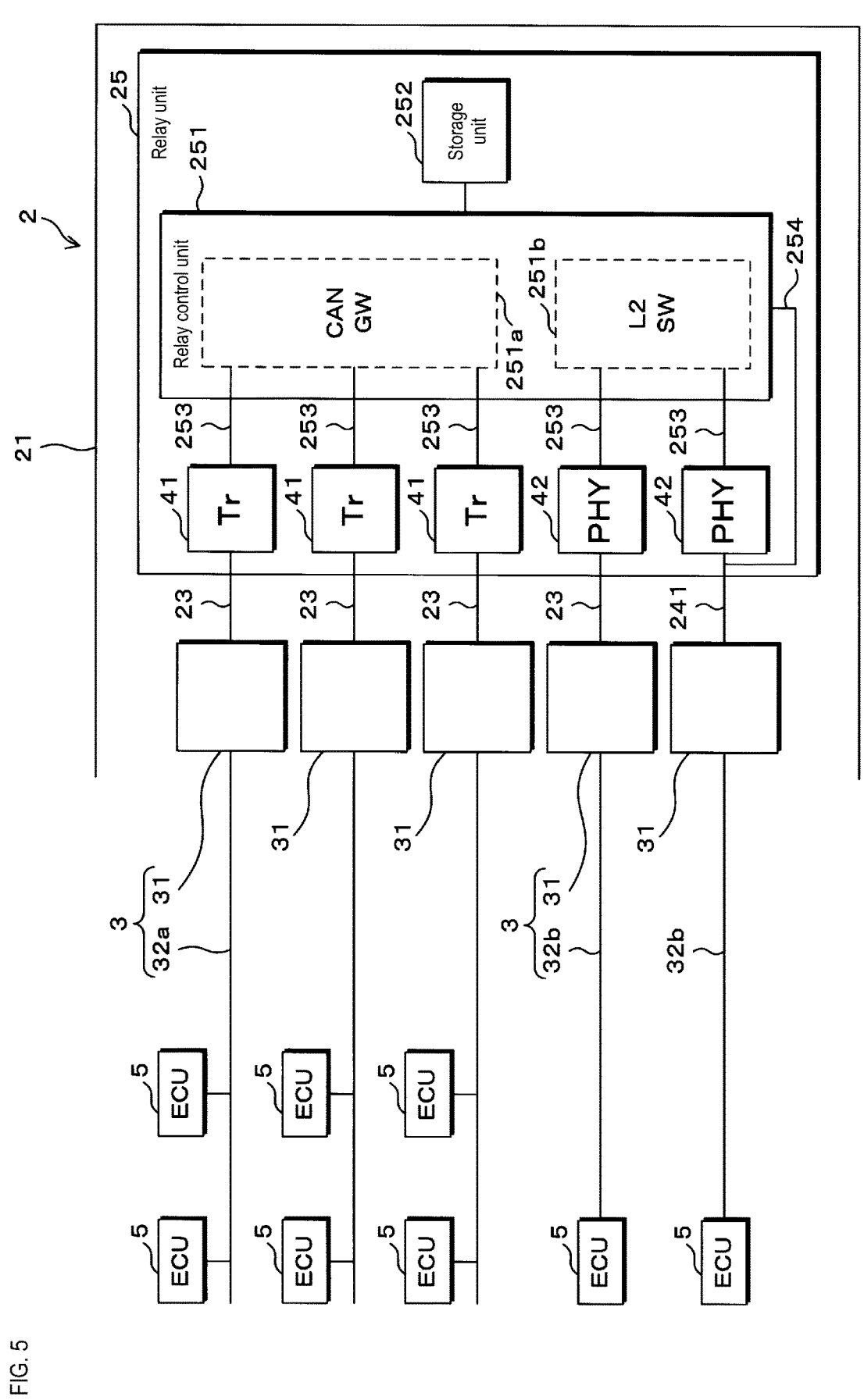
FIG. 5 is a block diagram illustrating the configuration of a relay unit of a joint connector of Embodiment 3.

FIG. 5 is a block diagram illustrating the configuration of a relay unit of a joint connector 2 of Embodiment 3. The joint connector 2 of Embodiment 3 differs from Embodiment 1 in that power (PoE (Power over Ethernet)) is received from an in-vehicle ECU 5 or in-vehicle sensor 51 via an Ethernet cable 32*b*.

The joint connector 2 of Embodiment 3 includes a sub-connector 22, a housing 21 and a relay unit 25 provided in the housing 21 similarly to Embodiment 1 (see FIG. 2). The relay unit 25 includes a storage unit 252, a relay control unit 251, and Ethernet PHYs 42. The configurations of the storage unit 252 and the relay control unit 251 are similar to Embodiment 1.

The joint connector 2 of Embodiment 3 includes a power-communication shared terminal 241. The power-communication shared terminal 241 is a conductive member that is electrically connected to the relay control unit 251 included in the relay unit 25. The power-communication shared terminal 241 protrudes from the other surface of the relay unit 25 toward the opening of the housing 21, and functions as a male terminal that mates with a female connector 31 of a wire harness 3 which will be described later, and electrically contacts the female terminal 311 in the female connector 31.

The wire harness 3 connected to the power-communication shared terminal 241 receives data that is transmitted from an in-vehicle ECU 5 connected to the wire harness 3, and receives power that is supplied from the in-vehicle ECU 5. The cable 32 of the wire harness 3 is an Ethernet cable 32*b* (Ethernet communication cable), and the in-vehicle ECU 5 and the joint connector 2 perform both communication and power transmission using the Ethernet cable 32*b*, by using PoE (Power over Ethernet/IEEE802.3af and 802.3at), via the power-communication shared terminal 241. That is, the power-communication shared terminal 241 is a terminal that supports PoE, and includes the functions of both the joint terminal 23 for communication and the power terminal 24 for power reception.

The power-communication shared terminal 241 is provided with a branch unit including a filter circuit or the like, for example. The power-communication shared terminal 241 is branched by the branch unit into a communication line that is connected to the Ethernet PHY 42 and a power internal bus 254 that is connected to the relay control unit 251. Data conforming to the Ethernet protocol flows through the communication line. Current for supplying power to the relay control unit 251 flows through the power internal bus 254.

By using the power-communication shared terminal 241 that supports PoE, routing of separate cables for the power line and the communication line is not necessary, and, with a single Ethernet cable 32*b*, an in-vehicle ECU 5 or in-vehicle sensor 51 can be communicably connected to the joint connector 2, and the joint connector 2 can receive power transmitted from the in-vehicle ECU 5 or the like. Accordingly, routing of cables such as the wire harnesses 3 in a vehicle can be simplified.

Embodiment 4

Figure 6:
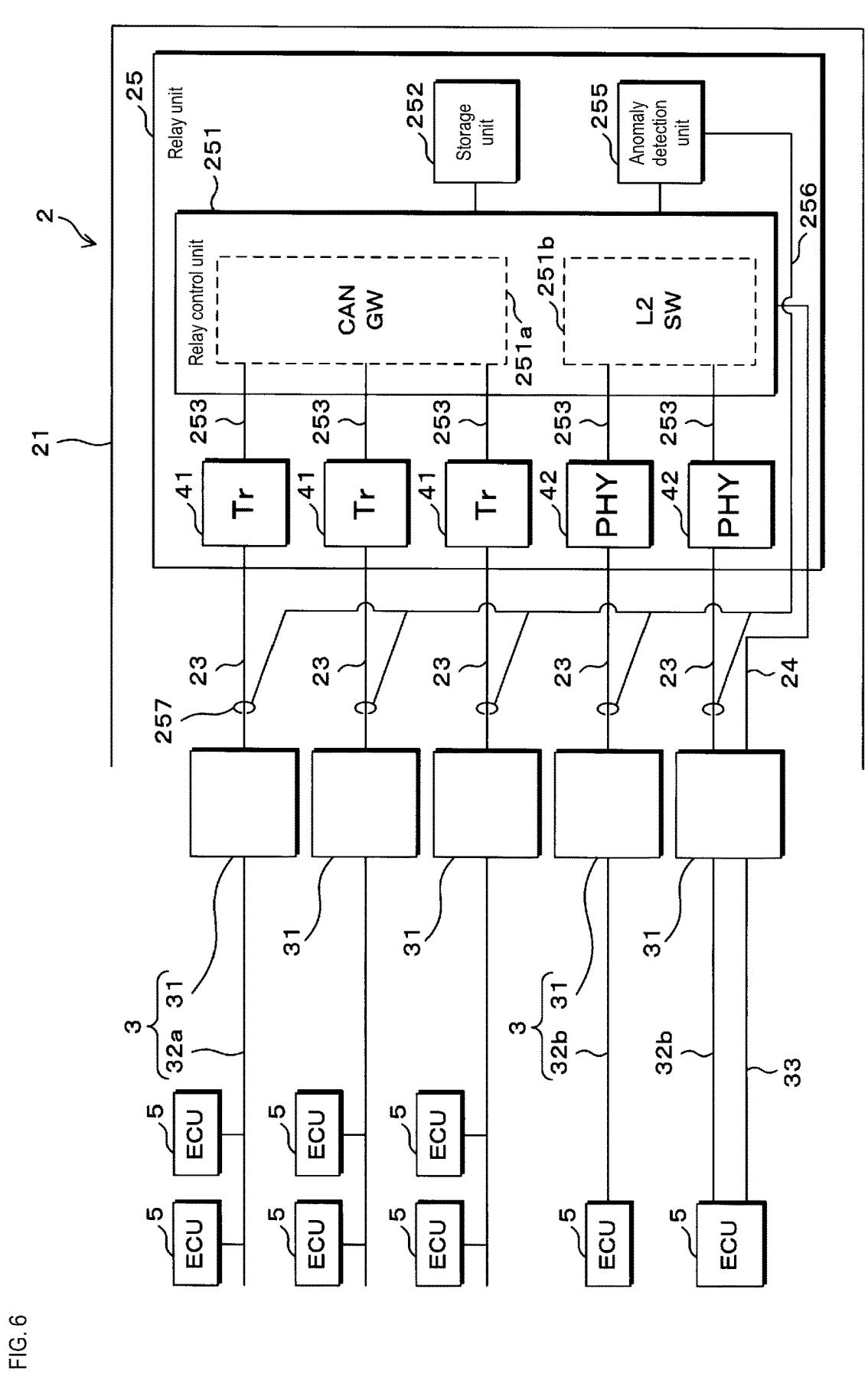
FIG. 6 is a block diagram illustrating the configuration of a relay unit of a joint connector of Embodiment 4.

FIG. 6 is a block diagram illustrating the configuration of a relay unit 25 of a joint connector 2 of Embodiment 4. The joint connector 2 of Embodiment 4 differs from Embodiment 1 in that an anomaly detection unit 255 that detects an anomaly of cables 32 that are connected to joint terminals 23 via female connectors 31 is included.

The joint connector 2 of Embodiment 4 includes a sub-connector 22, a housing 21 and a relay unit 25 provided in the housing 21 similarly to Embodiment 1 (see FIG. 2). The relay unit 25 includes a storage unit 252, a relay control unit 251, and Ethernet PHYs 42. The configurations of the storage unit 252 and the relay control unit 251 are similar to Embodiment 1.

The joint connector 2 of Embodiment 4 includes the anomaly detection unit 255. The anomaly detection unit 255 is included in the relay unit 25 and is connected to the relay control unit 251 by an internal bus 253. The anomaly detection unit 255 is communicably connected to sensors 257 by a signal line 256, and the sensors 257 are provided between the leading end of the joint terminals 23 and the CAN transceivers 41 or Ethernet PHYs 42, for example.

The sensors 257 are constituted by an electrical element such as a Hall element or shunt resistor, for example, and detect a detection value relating to the current value of current flowing through the wire harnesses 3 connecting the in-vehicle ECUs 5 and the joint connector 2, the impedance of the wire harnesses 3 or the like. The sensors 257 are provided between the leading end of the joint terminals 23 and the CAN transceivers 41 or Ethernet PHYs 42, and are able to efficiently detect a detection value relating to current flowing to the joint terminals 23, for example.

The anomaly detection unit 255 acquires a detection value such as the current value of current flowing through the wire harnesses 3 (cables 32) or the impedance of the cables 32 detected by the sensors 257, and detects a physical anomaly such as poor contact between the wire harnesses 3 (female connectors 31) and the joint terminals 23 or signs of disconnection of the cables 32, based on the detection value. The anomaly detection unit 255 may derive information relating to the degree of collapse of the square wave of current flowing through the wire harnesses 3 (corruption of communication), based on the detection value acquired from the sensors 257. The anomaly detection unit 255 detects anomalies relating to the wire harnesses 3, based on variables such as the change in impedance over a predetermined period and the frequency with which the current value (peak current) reaches a predetermined value or more. Upon starting relay control by the relay control unit 251, the anomaly detection unit 255 may detect anomalies relating to the wire harnesses 3, by requesting the relay control unit 251 to transmit a pseudo signal and acquiring information relating to reflection of the pseudo signal transmitted from the relay control unit 251.

In the present embodiment, the sensors 257 are provided between the leading end of the joint terminals 23 and the CAN transceivers 41 or Ethernet PHYs 42, but are not limited thereto. The sensors 257 provided to the respective joint terminals 23 may be mounted inside (built into) the CAN transceivers 41 or Ethernet PHYs 42. Alternatively, both the sensors 257 and the anomaly detection unit 255 may be mounted inside (built into) the CAN transceivers 41 or Ethernet PHYs 42.

According to the present embodiment, the joint connector 2 includes the anomaly detection unit 255 that detects physical anomalies such as poor contact and signs of disconnection of the wire harnesses 3 that are connected directly to the joint connector 2, thus enabling the accuracy of anomaly detection on the wire harnesses 3 to be improved. Also, the anomaly detection unit 255 is included in the joint connector 2, and can thus be easily replaced compared with the case where the anomaly detection unit 255 is installed in one of the in-vehicle ECUs 5, thus enabling replaceability to be improved.

Embodiment 5

Figure 7:
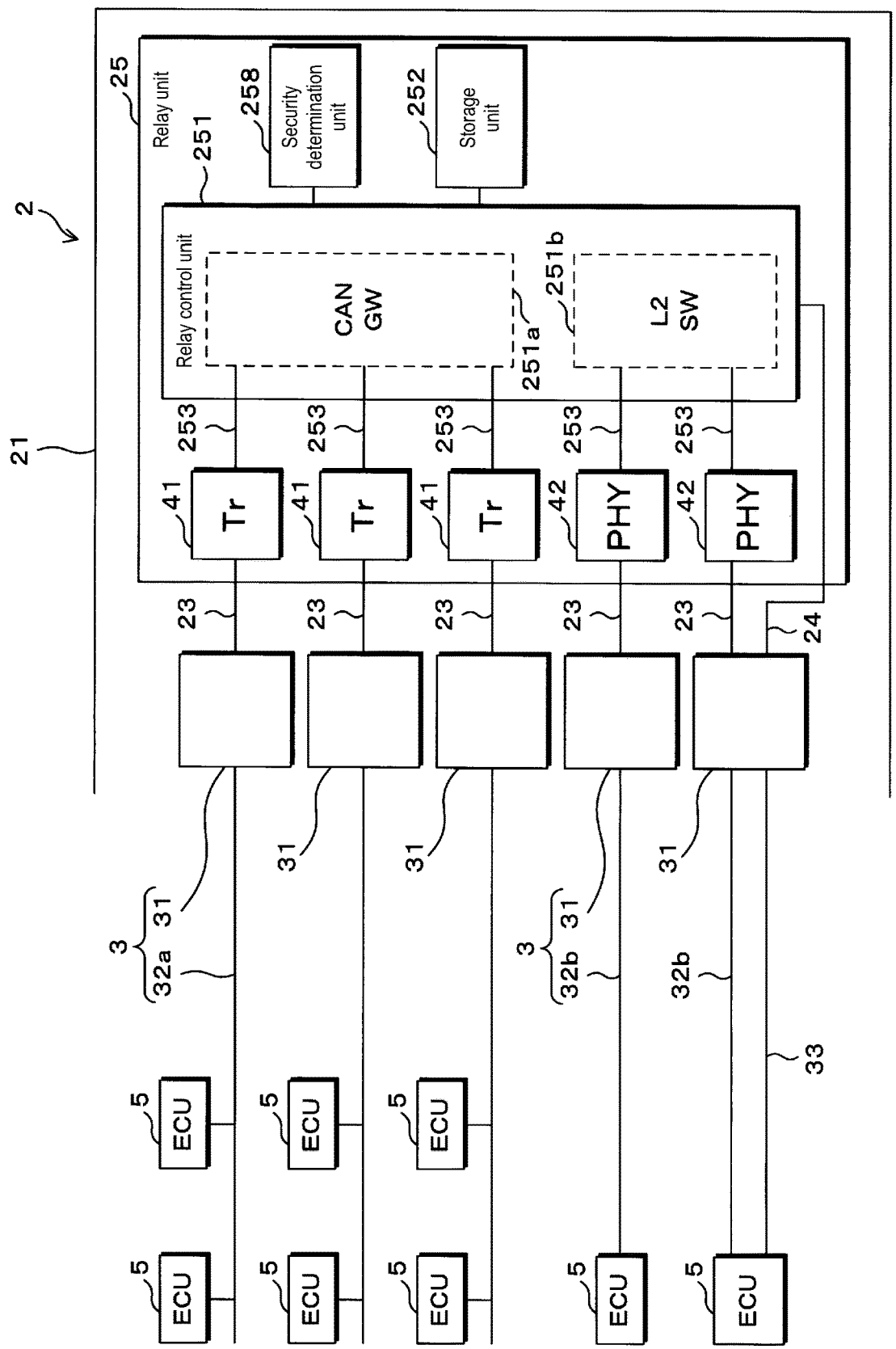
FIG. 7 is a block diagram illustrating the configuration of a relay unit of a joint connector of Embodiment 5.

FIG. 7 is a block diagram illustrating the configuration of a relay unit 25 of a joint connector 2 of Embodiment 5. The joint connector 2 of Embodiment 5 differs from Embodiment 1 in that a security determination unit 258 that determines matters relating to the security of data flowing through wire harnesses 3 is included.

The joint connector 2 of Embodiment 5 includes a sub-connector 22, a housing 21 and a relay unit 25 provided in the housing 21 similarly to Embodiment 1 (see FIG. 2). The relay unit 25 includes a storage unit 252, a relay control unit 251, and Ethernet PHYs 42. The configurations of the storage unit 252 and the relay control unit 251 are similar to Embodiment 1.

The joint connector 2 of Embodiment 5 includes the security determination unit 258. The security determination unit 258 is included in the relay unit 25 and is communicably connected to a relay control unit 251 by an internal bus 253. The security determination unit 258 may be constituted by a HSM (Hardware Security Module) or by an MCU (Micro Controller Unit) in which an IDS (Intrusion Detection System) is installed as an embedded program, for example.

The security determination unit 258 monitors data acquired (received) by the relay control unit 251 via the CAN transceivers 41 or Ethernet PHYs 42 (data flowing through the wire harnesses 3), and determines whether unauthorized messages or the like included in the data are included. The security determination unit 258 determines the validity of the messages through analysis, by determining appropriateness relating to encrypted processing, by executing a diagnostic program (diagnostic process), or by exhibiting the functions of an IDS, with respect to data acquired (received) by the relay control unit 251, for example. Alternatively, the security determination unit 258 may determine messages transmitted at a different period to the transmission period prescribed in transmitting data (messages) as unauthorized messages. The security determination unit 258, through monitoring, analysis and the like, determines the validity of data (messages) acquired (received) by the relay control unit 251 by such techniques, and may, for example, determine data (messages) transmitted from unauthorized (anomalous) in-vehicle ECUs 5 spoofing as authorized (normal) in-vehicle ECUs 5 as unauthorized messages.

According to the present embodiment, the joint connector 2 includes the security determination unit 258 that determines matters relating to the security of data flowing directly through the wire harnesses 3 connected directly to the joint connector 2, thus enabling the accuracy of the security determination on data flowing through the wire harnesses 3 to be improved. Also, the security determination unit 258 is included in the joint connector 2, and can thus be easily replaced compared with the case where the security determination unit 258 is installed in one of the in-vehicle ECUs 5, thus enabling replaceability to be improved.

The embodiments disclosed herein are considered in all respects to be illustrative and not restrictive. The scope of the disclosure is indicated by the claims rather than by the foregoing meaning, and all changes that come within the meaning and range of equivalency of the claims are intended to be embraced therein.

The invention claimed is:

1. A joint connector configured to have a plurality of wire harnesses connected thereto and join the plurality of wire harnesses, the joint connector comprising:
   a sub-connector configured to have connectors of the plurality of wire harnesses inserted therein;
   a housing inside which the sub-connector is provided;
   a plurality of joint terminals arranged in parallel with each other in a protruding state within the sub-connector, and respectively connected to the connectors of the plurality of wire harnesses; and
   a relay unit provided in the housing and connected to the plurality of joint terminals,
   wherein the relay unit is configured to, based on information included in data transmitted from an in-vehicle ECU or in-vehicle sensor connected to the plurality of wire harnesses, perform relay control of the data between the plurality of joint terminals,
   the in-vehicle ECU or in-vehicle sensor communicates by at least one communication protocol out of CAN and Ethernet,
   the relay unit includes at least one of a CAN gateway and a layer 2 Ethernet switch,
   the connectors of the plurality of wire harnesses are each provided with a CAN transceiver or an Ethernet PHY unit,
   the relay unit is connected to the CAN transceiver or the Ethernet PHY unit via the joint terminal,
   the relay unit has connected thereto a power terminal that receives input of power output from one in-vehicle ECU or in-vehicle sensor among the in-vehicle ECUs or in-vehicle sensors connected to the plurality of wire harnesses, and
   at least one joint terminal among the plurality of joint terminals is provided in a pair with the power terminal within a space partitioned by a partition plate or a socket part of the sub-connector.

2. The joint connector according to claim 1,
   wherein the in-vehicle ECU or in-vehicle sensor communicates by at least one communication protocol out of CAN and Ethernet, and
   the relay unit includes a CAN gateway and a layer 2 Ethernet switch, and performs protocol conversion between the CAN and Ethernet communication protocols.

3. The joint connector according to claim 1,
wherein the relay unit has connected thereto a power terminal that receives input of power output from one in-vehicle ECU or in-vehicle sensor among the in-vehicle ECUs or in-vehicle sensors connected to the plurality of wire harnesses, or the joint terminal is a power-communication shared terminal through which the data relay controlled by the relay unit flows, and that receives input of power output from one in-vehicle ECU or in-vehicle sensor among the in-vehicle ECUs or in-vehicle sensors connected to the plurality of wire harnesses.

4. The joint connector according to claim 1, comprising:
an anomaly detection unit provided in the housing and configured to perform anomaly detection of each of the plurality of wire harnesses respectively connected to the plurality of joint terminals.

5. The joint connector according to claim 1, comprising:
a security determination unit provided in the housing and configured to perform security determination on data transmitted from the in-vehicle ECUs or in-vehicle sensors connected to the plurality of wire harnesses.

6. The joint connector according to claim 2,
wherein the relay unit has connected thereto a power terminal that receives input of power output from one in-vehicle ECU or in-vehicle sensor among the in-vehicle ECUs or in-vehicle sensors connected to the plurality of wire harnesses, or the joint terminal is a power-communication shared terminal through which the data relay controlled by the relay unit flows, and that receives input of power output from one in-vehicle ECU or in-vehicle sensor among the in-vehicle ECUs or in-vehicle sensors connected to the plurality of wire harnesses.

7. The joint connector according to claim 2, comprising:
an anomaly detection unit provided in the housing and configured to perform anomaly detection of each of the plurality of wire harnesses respectively connected to the plurality of joint terminals.

8. The joint connector according to claim 3, comprising:
an anomaly detection unit provided in the housing and configured to perform anomaly detection of each of the plurality of wire harnesses respectively connected to the plurality of joint terminals.

9. The joint connector according to claim 2, comprising:
a security determination unit provided in the housing and configured to perform security determination on data transmitted from the in-vehicle ECUs or in-vehicle sensors connected to the plurality of wire harnesses.

10. The joint connector according to claim 3, comprising:
a security determination unit provided in the housing and configured to perform security determination on data transmitted from the in-vehicle ECUs or in-vehicle sensors connected to the plurality of wire harnesses.

11. The joint connector according to claim 4, comprising:
a security determination unit provided in the housing and configured to perform security determination on data transmitted from the in-vehicle ECUs or in-vehicle sensors connected to the plurality of wire harnesses.

* * * * *